United States Statutory Invention Registration [19]

[11] Reg. Number: H849

Branovich et al. [43] Published: Nov. 6, 1990

[54] METHOD OF MAKING A CATHODE FROM TUNGSTEN AND IRIDIUM POWDERS USING A STRONTIUM PEROXIDE CONTAINING MATERIAL AS THE IMPREGNANT

[75] Inventors: Louis E. Branovich, Howell Township, Monmouth County; Gerard L. Freeman, Freehold Township, Monmouth County; Bernard Smith, Ocean, all of N.J.

[73] Assignee: The United States of America as represented by the Secretary of the Army, Washington, D.C.

[21] Appl. No.: 277,575

[22] Filed: Nov. 25, 1988

[51] Int. Cl.[5] ..... B22F 3/26
[52] U.S. Cl. ..... 445/50; 445/51
[58] Field of Search ..... 445/50, 51, 49

[56] References Cited

U.S. PATENT DOCUMENTS

| | | | |
|---|---|---|---|
| 2,106,753 | 2/1936 | Lederer | 445/51 |
| 3,290,124 | 12/1966 | Holtzclaw | 445/49 |
| 4,675,570 | 6/1987 | Green | 445/51 |
| 4,708,681 | 11/1987 | Branovich | 445/50 |
| 4,734,073 | 3/1988 | Smith | 445/50 |
| 4,735,591 | 4/1988 | Branovich | 445/50 |
| 4,818,480 | 4/1989 | Branovich | 419/27 |

FOREIGN PATENT DOCUMENTS

| | | | |
|---|---|---|---|
| 0046413 | 4/1980 | Japan | 445/51 |
| 0095253 | 7/1980 | Japan | 445/51 |

*Primary Examiner*—Charles T. Jordan
*Assistant Examiner*—Michael J. Carone
*Attorney, Agent, or Firm*—Michael Zelenka; Roy E. Gordon

[57] ABSTRACT

A cathode is made from a mixture of tungsten and iridium powders using a strontium peroxide containing material as the impregnant.

14 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MAKING A CATHODE FROM TUNGSTEN AND IRIDIUM POWDERS USING A STRONTIUM PEROXIDE CONTAINING MATERIAL AS THE IMPREGNANT

The invention described herein may be manufactured, used and licensed by or for the Government for governmental purposes without the payment to us of any royalty thereon.

This application is copending with U.S. patent application Ser. No. 204,327, now U.S. Pat. No. 4,818,480 filed June 9, 1988 for "Method Of Making A Cathode From Tungsten And Iridium Powders Using A Barium Peroxide Containing Material As The Impregnant" by L. E. Branovich, G. L. Freeman, B. Smith, and D. W. Eckart and assigned to a common assignee.

This invention relates in general to a method of making a long life high current density cathode and in particular, to a method of making such a cathode from a mixture of tungsten and iridium powders using a strontium peroxide containing material as the impregnant.

BACKGROUND OF THE INVENTION

The state of the art as concerns the manufacture of long life high current density cathodes involves the initial mixing and heating of barium carbonate, $BaCO_3$ calcium carbonate, $CaCO_3$ and aluminum oxide, $Al_2O_3$. The $BaCO_3$ and $CaCO_3$ are decomposed at 1450° C. to form BaO and CaO that react with the $Al_2O_3$ to form aluminates. The aluminates are then impregnated into a porous billet of tungsten, or tungsten and iridium, or tungsten and osmium or tungsten and rhodium, etc., heated in a cathode environment, and testing made. The process involves the decomposition of the aluminates to form the barium iridiates, barium osmiates, and barium rhodiates.

In Ser. No. 204,327, an improved method of making a long life high density cathode is described and claimed in which the intermediate formation of aluminates is obviated and in which lower temperatures can be used. In the method of Ser. No. 204,327 a barium peroxide containing material is used as the impregnant. More particularly, according to the Ser. No. 204,327 method, a suitable porous billet of tungsten, or tungsten-iridium, or tungsten-osmium or tungsten-rhodium is impregnated with a barium peroxide containing material in a hydrogen atmosphere and slowly heated to above 800° C. to decompose the barium peroxide, $BaO_2$ to form barium oxide, BaO and oxygen $O_2$ according to the reaction:

$$2BaO_2 \rightarrow 2BaO + O_2$$

The sample BaO reacts with the tungsten wall of the billet or the tungsten-rhodium wall of the billet to form the desired oxyanion.

Though the Ser. No. 204,327 method is desirable, it would be of further advantage in the manufacture of a long life high current density cathode to use even lower temperatures in the impregnation of the tungsten-iridium billet.

SUMMARY OF THE INVENTION

The general object of this invention is to provide an improved method of making a long life high current density cathode. A more specific object of the invention is to provide such a method in which lower temperatures can be used than were used in Ser. No. 204,327 for the impregnation of the tungsten-iridium billet.

It has now been found that the aforementioned objects can be attained by a method that uses a strontium peroxide containing material as the impregnant. Such a material can be strontium peroxide alone, or a mixture of strontium peroxide with iridium, or a mixture of strontium peroxide with iridium oxide, or a mixture of strontium peroxide with osmium, or a mixture of strontium peroxide with osmium oxide, or a mixture or strontium peroxide with rhodium, or a mixture of strontium peroxide with rhodium oxide, or a mixture of strontium peroxide with ruthenium, or a mixture of strontium peroxide with ruthenium oxide.

More particularly, according to the invention, a suitable porous billet of tungsten, or tungsten-iridium, or tungsten-osmium or tungsten-rhodium is impregnated with a strontium peroxide containing material in a hydrogen atmosphere and slowly heated to above 215° C. to decompose the strontium peroxide, $SrO_2$ to form strontium oxide, SrO, and oxygen, $O_2$ according to the reaction:

$$2SrO_2 \xrightarrow{215^\circ C.} 2SrO + O_2$$

The sample SrO reacts with the tungsten wall of the billet or the tungsten-rhodium wall of the billet to form the desired oxyanion.

The strontium peroxide can be mixed with a known molar mixture of iridium oxide, $IrO_2$ or osmium oxide, $Os_2O_3$ or rhodium oxide, $Rh_2O_3$. For example, if the mix is a 4:1 molar mixture of $SrO_2$:$IrO_2$, the following compound will be generated after the $SrO_2$ is decomposed at 215° C.

$$2SrO_2 \xrightarrow{215^\circ C.} 2SrO + O_2$$

$$4SrO + IrO_2 \longrightarrow Sr_4IrO_6$$

Thus, when 4:1 mixture is fired in hydrogen, the compound $Sr_4IrO_6$ is generated.

If the mix is a 1:1 molar mixture of $SrO_2$:$IrO_2$, then the following compound will be generated after the $SrO_2$ is decomposed at 215° C.

$$SrO + IrO_2 \rightarrow SrIrO_3$$

If the mixture is a 2:1 molar mixture of $SrO_2$:$IrO_2$, then the following compound will be generated after the $SrO_2$ is decomposed at 215° C.

$$2SrO + IrO_2 \rightarrow Sr_2IrO_4$$

The generated compounds will decompose when in a cathode environment with heat in the presence of a tungsten billet or a tungsten-iridium billet to generate the SrO. The SrO will then react with the tungsten of the billet according to the reaction $$6SrO + W \rightarrow Sr_3WO_6 + 3Sr$$

The strontium, Sr will generate the electron emission better than the barium alone since the strontium has a lower work function than the barium.

In the method of the invention, the heating of the billet with the impregnant is complete when the impregnant is solidified The impregnant solidifies when the temperature is raised slowly above 215° C. or by rapid heating above 215° C. The slower process of heating above 215° C. allows the impregnant more time to react.

After the reaction is complete, the sample is removed and the system flushed with nitrogen. The material that did not enter into the pores of the billet is removed using a jeweler's lathe and the billet then placed into a cathode environment for electrical testing of current density emissions and life studies.

DESCRIPTION OF THE PREFERRED EMBODIMENT

A long life high current density cathode is made in the following manner. Tungsten and iridium powders are mixed in a weight ratio of about 65 weight percent tungsten to about 34 weight percent iridium. 1 percent by weight of zirconium hydride activator is added to the mixture and the mixture ball milled for about 8 hours. The ball milled mixture is then pressed into a billet at about 48,000 p.s.i. in a die and the billet then sintered at 1800° C. for thirty minutes in dry hydrogen of less than −100 dewpoint. The billet is then backfilled with copper in dry hydrogen at 1500° C., the billet machined to the desired geometry, and the copper then removed by etching in nitric acid. The porous billet is then thoroughly rinsed in deionized water, methanol and then dried. The billet is then impregnated with strontium peroxide by slowly heating to above 215° C. for about two minutes. The billet is removed from the furnace after the furnace is cooled, and loose particles of impregnant are removed from the billet using a jeweler's lathe and fine alumina cloth The resulting cathode is then mounted in a test vehicle and activated using standard matrix cathode activation procedures.

When the impregnant is strontium peroxide mixed with iridium or osmium or rhodium or ruthenium, molar ratios will vary depending upon how long the reaction is run.

We wish it to be understood that we do not desire to be limited to the exact details of construction as described for obvious modifications will occur to a person skilled in the art.

What is claimed is:

1. Method of making a cathode for operation in microwave devices from tungsten and iridium powders using a strontium peroxide containing material as the impregnant, said method including the steps of:

(A) mixing the tungsten and iridium powders,
(B) adding about 2 percent by weight of an activator to the mixture,
(C) ball milling the mixture for about 8 hours,
(D) pressing the ball millet mixture into a billet at bout 48,000 p.s.i. in a die,
(E) sintering the billet at about 1800° C. for about thirty minutes in dry hydrogen of less than −100 dewpoint,
(F) backfilling the billet with copper in dry hydrogen at about 1500° C.,
(G) machining the billet to the desired geometry,
(H) removing the copper by etching in nitric acid,
(I) thoroughly rinsing in deionized water, methanol and then drying,
(J) firing the billet in dry hydrogen at about 1400° C. or about 15 minutes.
(K) impregnating the billet with a strontium peroxide containing material by firing the billet in a dry hydrogen furnace at a temperature at which the impregnant melts for about two minutes,
(L) removing the billet from the furnace after the furnace is cooled, and
(M) removing any loose pieces of impregnant from the billet.

2. Method of making a long life high current density cathode according to claim 1 wherein in step (A), the tungsten and iridium powders are mixed in a weight ratio of about 65 weight percent tungsten to about 34 weight percent iridium.

3. Method of making a cathode according to claim 1 wherein in step (B) the activator is about 1 weight percent zirconium hydride.

4. Method of making a cathode according to claim 1 wherein in step (K), the strontium peroxide containing material is selected from the group consisting of strontium peroxide, a mixture of strontium peroxide with iridium oxide, a mixture of strontium peroxide with iridium, a mixture of strontium peroxide with osmium oxide, a mixture of strontium peroxide with osmium, a mixture of strontium peroxide with rhodium oxide, a mixture of strontium peroxide with rhodium a mixture of strontium peroxide with ruthenium oxide, and a mixture of strontium peroxide with ruthenium.

5. Method of making a cathode according to claim 4 wherein in step (K), the strontium peroxide containing material is strontium peroxide.

6. Method of making a cathode for operation in microwave devices from tungsten and iridium powders using a strontium peroxide containing material as the impregnant, said method including the steps of:

(A) mixing the tungsten and iridium powders,
(B) adding about 2 percent by weight of an activator to the mixture,
(C) ball milling the mixture for about 8 hours,
(D) pressing the ball milled mixture into a billet at about 48,000 p.s.i. in a die;
(E) sintering the billet at about 1800 C. for about thirty minutes in dry hydrogen of less than −100 dewpoint,
(F) backfilling the billet with copper in dry hydrogen at about 1500 C.,
(G) machining the billet to the desired geometry,
(H) removing the copper by etching in nitric acid,
(I) thoroughly rinsing in deionized water, methanol and then drying,
(J) firing the billet in dry hydrogen at about 1400 C. for about 15 minutes,
(K) impregnating the billet with a mixture of strontium peroxide with iridium oxide by firing the billet in a dry hydrogen furnace at a temperature at which the impregnant melts for about two minutes,
(L) removing the billet from the furnace after the furnace is cooled, and
(M) removing any loose pieces of impregnant from the billet.

7. Method of making a cathode for operation in microwave devices from tungsten and iridium powders using a strontium peroxide containing material as the impregnant, said method including the steps of:

(A) mixing the tungsten and iridium powders,
(B) adding about 2 percent by weight of an activator to the mixture,
(C) ball milling the mixture for about 8 hours, (D) pressing the ball milled mixture into a billet at about 48,000 p.s.i. in a die;
(E) sintering the billet at about 1800 C. for about thirty minutes in dry hydrogen of less than −100 dewpoint,
(F) backfilling the billet copper in dry hydrogen at about 1500 C.,
(G) machining the billet to the desired geometry,
(H) removing the copper by etching in nitric acid,
(I) thoroughly rinsing in deionized water, methanol and then drying,
(J) firing the billet in dry hydrogen at about 1400 C. for about 15 minutes,
(K) impregnating the billet with a mixture of strontium peroxide with iridium by firing the billet in a dry hydrogen furnace at a temperature at which the impregnant melts for about two minutes,
(L) removing the billet from the furnace after the furnace is cooled, and
(M) removing any loose pieces of impregnant from the billet.

8. Method of making a cathode for operation in microwave devices from tungsten and iridium powders using a strontium peroxide containing material as the impregnant, said method including the steps of:
(A) mixing the tungsten an diridium powders,
(B) adding about 2 percent by weight of an activator to the mixture,
(C) ball milling the mixture for about 8 hours,
(D) pressing the ball milled mixture into a billet at about 48,000 p.s.i. in a die;
(E) sintering the billet at about 1800 C. for about thirty minutes in dry hydrogen of less than −100 dewpoint,
(F) backfilling the billet with copper in dry hydrogen at about 1500 C.,
(G) machining the billet to the desired geometry,
(H) removing the copper by etching in nitric acid,
(I) thoroughly rinsing in deionized water, methanol and then drying,
(J) firing the billet in dry hydrogen at about 1400 C. for about 15 minutes,
(K) impregnating the billet with a mixture of strontium peroxide with osmium oxide by firing the billet in a dry hydrogen furnace at a temperature at which the impregnant melts for about two minutes,
(L) removing the billet from the furnace after the furnace is cooled, and
(M) removing any loose pieces of impregnant from the billet.

9. Method of making a cathode for operation in microwave devices from tungsten and iridium powders using a strontium peroxide containing material as the impregnant, said method including the steps of:
(A) mixing the tungsten and iridium powders,
(B) adding about 2 percent by weight of an activator to the mixture,
(C) ball milling the mixture for about 8 hours,
(D) pressing the ball milled mixture into a billet at about 48,000 p.s.i. in a die;
(E) sintering the billet at about 1800 C. for about thirty minutes in dry hydrogen of less than −100 dewpoint,
(F) backfilling the billet with copper in dry hydrogen at about 1500 C.,
(G) machining the billet to the desired geometry,
(H) removing the copper by etching in nitric acid,
(I) thoroughly rinsing in deionized water, methanol and then drying,
(J) firing the billet in dry hydrogen at about 1400 C. for about 15 minutes,
(K) impregnating the billet with a mixture of strontium peroxide with osmium by firing the billet in a dry hydrogen furnace at a temperature at which the impregnant melts for about two minutes,
(L) removing the billet from the furnace after the furnace is cooled, and
(M) removing any loose pieces of impregnant from the billet.

10. Method of making a cathode for operation in microwave devices from tungsten and iridium powders using a strontium peroxide containing material as the impregnant, said method including the steps of:
(A) mixing the tungsten and iridium powders,
(B) adding about 2 percent by weight of an activator to the mixture,
(C) ball milling the mixture for about 8 hours,
(D) pressing the ball milled mixture into a billet at about 48,000 p.s.i. in a die;
(E) sintering the billet at about 1800 C. for about thirty minutes in dry hydrogen of less than −100 dewpoint,
(F) backfilling the billet with copper in dry hydrogen at about 1500 C.,
(G) machining the billet to the desired geometry,
(H) removing the copper by etching in nitric acid,
(I) thoroughly rinsing in deionized water, methanol and then drying,
(J) firing the billet in dry hydrogen at about 1400 C for about 15 minutes,
(K) impregnating the billet with a mixture of strontium peroxide with rhodium oxide by firing the billet in a dry hydrogen furnace at a temperature at which the impregnant melts for about two minutes,
(L) removing the billet from the furnace after the furnace is cooled, and
(M) removing any loose pieces of impregnant from the billet.

11. Method of making a cathode for operation in microwave devices from tungsten and iridium powders using a strontium peroxide containing material as the impregnant, said method including the steps of:
(A) mixing the tungsten and iridium powders,
(B) adding about 2 percent by weight of an activator to the mixture,
(C) ball milling the mixture for about 8 hours,
(D) pressing the ball milled mixture into a billet at about 48,000 p.s.i. in a die;
(E) sintering the billet at about 1800 C for about thirty minutes in dry hydrogen of less than −100 dewpoint,
(F) backfilling the billet with copper in dry hydrogen at about 500 C,
(G) machining the billet to the desired geometry,
(H) removing the copper by etching in nitric acid,
(I) thoroughly rinsing in deionized water, ethanol and then drying,
(J) firing the billet in dry hydrogen at about 1400 C for about 15 minutes,
(K) impregnating the billet with a mixture of strontium peroxide with rhodium by firing the billet in a dry hydrogen furnace at a temperature at which the impregnant melts for about two minutes,
(L) removing the billet from the furnace after the furnace is cooled, and (M) removing any loose pieces of impregnant from the billet.

12. Method of making a cathode for operation in microwave devices from tungsten and iridium powers using a strontium peroxide containing material as the impregnant, said method including the steps of:

(A) mixing the tungsten and iridium powders,
(B) adding about 2 percent by weight of an activator to the mixture,
(C) ball milling the mixture for about 8 hours,
(D) pressing the ball milled mixture into a billet at about 48,000 p.s.i. in die;
(E) sintering the billet at about 1800 C. for about thirty minutes in dry hydrogen of less than −100 dewpoint,
(F) backfilling the billet with copper in dry hydrogen at about 1500 C.,
(G) machining the billet to the desired geometry,
(H) removing the copper by etching in nitric acid,
(I) thoroughly rinsing in deionized water, methanol and then drying,
(J) firing the billet in dry hydrogen at about 1400 C for about 15 minutes,
(K) impregnating the billet with a mixture of strontium peroxide with ruthenium oxide by firing the billet in a dry hydrogen furnace at a temperature at which the impregnant melts for about two minutes,
(L) removing the billet from the furnace after the furnace is cooled, and
(M) removing any loose pieces of impregnant from the billet.

13. Method of making a cathode for operation in microwave devices from tungsten and iridium powders using a strontium peroxide containing material as the impregnant, said method including the steps of:

(A) mixing the tungsten and iridium powders,
(B) adding about 2 percent by weight of an activator to the mixture,
(C) ball milling the mixture for about 8 hours,
(D) pressing the ball milled mixture into a billet at about 48,000 p.s.i. in a die;
(E) sintering the billet at about 1800 C. for about thirty minutes in dry hydrogen of less than −100 dewpoint,
(F) backfilling the billet with copper in dry hydrogen at about 1500 C,
(G) machining the billet to the desired geometry,
(H) removing the copper by etching in nitric acid,
(I) thoroughly rinsing in deionized water, methanol and then drying,
(J) firing the billet in dry hydrogen at about 1400 C for about 15 minutes,
(K) impregnating the billet with a mixture of strontium peroxide with ruthenium by firing the billet in a dry hydrogen furnace at a temperature at which the impregnant melts for about two minutes,
(L) removing the billet from the furnace after the furnace is cooled, and
(M) removing any loose pieces of impregnant from the billet.

14. Method of making a cathode for operation in microwave devices from tungsten and iridium powders using strontium peroxide as the impregnant, said method including the steps of:

(A) mixing the tungsten and iridium powders in the weight ratio of about 65 weight percent tungsten to about 34 weight percent iridium,
(B) adding about 1 percent by weight of zirconium hydride to the mixture,
(C) ball milling the mixture for about 8 hours,
(D) pressing the ball milled mixture into a billet at about 48,000 p.s.i. in a die,
(E) sintering the billet at about 1800° C. for about thirty minutes in dry hydrogen of less than −100 dewpoint,
(F) back filling the billet with copper in dry hydrogen at about 1150° C.
(G) machining the billet to the desired geometry,
(H) removing the copper by etching in nitric acid,
(I) thoroughly rinsing in deionized water, methanol and then drying,
(J) firing the billet in dry hydrogen at about 1400° C. for about 15 minutes,
(K) impregnating the billet with the strontium peroxide by firing the billet in a dry hydrogen furnace at about 215° C. for about 2 minutes,
(L) removing the billet from the furnace after the furnace is cooled, and
(M) removing any loose pieces of impregnant from the billet.

* * * * *